April 26, 1966 J. DE JARNETTE BURKE, JR., ETAL 3,247,546
SPINNERETTE
Original Filed May 9, 1962 2 Sheets-Sheet 1

INVENTORS
JAMES DE JARNETTE BURKE, JR.
CURTIS OWEN HAWKINS

BY *Harry C. Braddock*
ATTORNEY

April 26, 1966 J. DE JARNETTE BURKE, JR., ETAL 3,247,546
SPINNERETTE
Original Filed May 9, 1962 2 Sheets-Sheet 2

INVENTORS
JAMES DE JARNETTE BURKE, JR.
CURTIS OWEN HAWKINS

BY *Harry C. Braddick*

ATTORNEY

United States Patent Office 3,247,546
Patented Apr. 26, 1966

3,247,546
SPINNERETTE
James De Jarnette Burke, Jr., Kinston, and Curtis Owen Hawkins, Cove City, N.C., assignors to E. I. du Pont de Nemours and Company, Wilmington, Del., a corporation of Delaware
Original application May 9, 1962, Ser. No. 193,418, now Patent No. 3,141,358, dated July 21, 1964. Divided and this application Sept. 17, 1963, Ser. No. 309,557
2 Claims. (Cl. 18—8)

This is a divisional application of my copending application Serial No. 193,418, filed May 9, 1962, now Patent No. 3,141,358.

This invention relates generally to apparatus for extrusion of viscous organic materials and, more particularly, to the fabrication of spinnerette plates adapted for use in the spinning of synthetic filaments.

In the preparation of spinnerette plate capillary passageways, the procedure of punching a straight round hole through the remaining thickness of a blank remaining after the blank has been initially partially counterbored is known. The fabrication of passageways by drilling is also well-known. The straight-walled capillary portion of the passageway has been limited either to short length or to relatively large diameter by the physical characteristics of the punch, drill or other tools used to form the passageway. Straight-sided punches of sufficiently small transverse cross section, or fineness, to produce small holes are prone to breakage during the punching operation. Therefore, most punches are tapered toward the point in order to increase the punch rigidity and strength. It has been found that drills are even more fragile than punches, and therefore their use is usually economically limited to larger sized holes or spinnerette plate passageways.

Of even greater concern than the economy and ease of manufacture of either punched or drilled holes made by methods known heretofore, is the inefficiency and difficulty encountered in the extrusion operation, using spinnerettes fabricated according to the best previously known techniques. Because of the short length of capillary passageways or holes when made by methods of the prior art, insufficient molecular orientation is imparted to the filaments during spinning or extrusion of the filaments, causing their cross-sectional shapes to alter considerably from the designed shape of the hole and orifice. Particularly, in the spinning of hollow filaments, a short capillary section of the passageway or hole, reduces significantly the amount of structural support to the internal element or obstruction in the passageway which produces the hollow interior portion of the filament. In addition, failure to impart sufficient orientation to the filaments during spinning or extrusion causes many undesired opened or split filaments to be formed instead of the desired true hollow filaments.

An object of the invention is the provision of improved spinnerette plate structures of improved structural properties and having passageways and extrusion orifices of great uniformity.

With this and other objects in view, the presently disclosed method of manufacturing the spinnerette plate comprises generally the steps of forming a protuberance on the spinnerette plate face, stamping into the protuberance from the face side with a shaped punch tapered in a direction of its advance to form a tapered hole and pressing the protuberance from the face side to displace the plate structure defining the protuberance and hole in an amount sufficient to constrict the orifice formed by the tapered hole in the face and angularly align the tapered side walls of the hole into desired parallel relationship to form a hole with substantially cylindrical side walls. In addition, the face of the spinnerette may then be lapped, if desired.

Other objects and advantages will appear from a review of the specification and claims, taken with the accompanying drawings in which:

Figure 1:
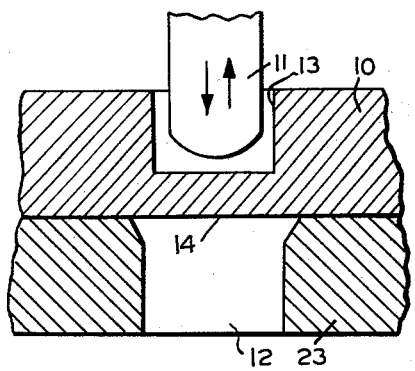
FIGURE 1 is a cross-sectional view of a portion of a spinnerette plate blank, showing a ram or plunger in position to form a protuberance on the spinnerette face supported by a die.
Figure 2:
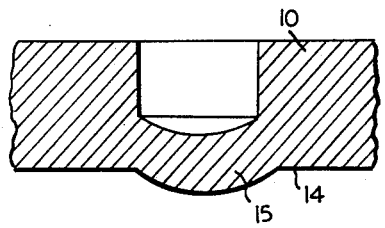
FIGURE 2 is a cross-section showing the protuberance formed on the face of the spinnerette plate.
Figure 2A:
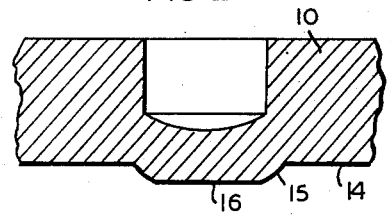
FIGURE 2a is a cross-section showing an optional formation of a flat surface on the protuberance of the spinnerette plate face.

Referring now to FIGURE 1 the numeral 10 designates a spinnerette plate blank containing a spinnerette plate counterbore hole 13 aligned with a cavity 12 in a back-up die 23. The face 14 of the spinnerette 10 is in contact with said die. In this position, pressure from a suitable conventional outside source (not illustrated) on the ram 11, in the downward direction as shown in FIGURE 1, will cause a protuberance 15 to be formed on the face 14 of the spinnerette plate as illustrated in FIGURE 2. It is preferable, though not required, to lap slightly the face of the protuberance 15 to form a flat surface 16 therein which prevents deflection of the punch subsequently used in a following operation. The flattened protuberance 16 is illustrated in FIGURE 2a.

Figure 3:
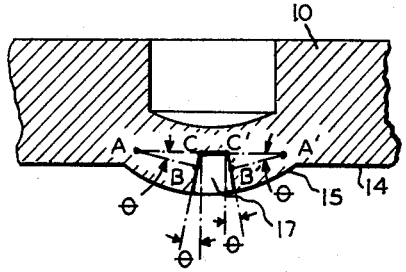
FIGURE 3 is a cross-section showing a hole or indentation with tapered walls as formed by a tapered punch.
Figure 4:
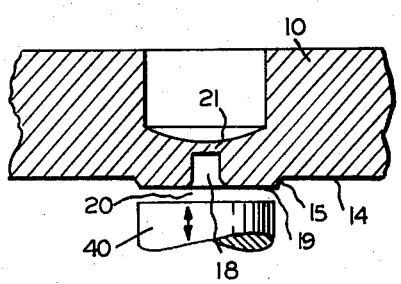
FIGURE 4 is a cross-section showing the resulting straight-walled hole formed by pressing the protuberance from the face side of the spinnerette plate a sufficient amount.

Using a punch tapered in its direction of advance and shaped to form the desired outline of the hole, the spinnerette is stamped from the face side 14 to form a hole or indentation 17 of the desired depth. FIGURE 3 illustrates the tapered hole 17. The protuberance 15 surrounding the tapered hole 17 is now pressed from the face side 14 of the spinnerette forcing the metal surrounding hole 17 to reduce the size of the hole 17 until the walls of the hole have become nearly parallel, or substantially cylindrical in configuration, as illustrated by hole 18 in FIGURE 4. The flat surface 19 formed by pressing, the rounded edges of the hole 20, and as much of the remaining protuberance 15 as desired may be removed next by sanding, grinding, or polishing. The straight-sided hole 18 is now connected to the counterbore 13 by drilling through the counterbore to remove the intervening metal 21. This extension of the counterbore may be flat bottomed, or may be tapered as illustrated in FIGURE 5, numeral 22.

After inspection, the finished hole may be broached, lapped, or polished as necessary to remove burrs or scratches.

Figure 5:
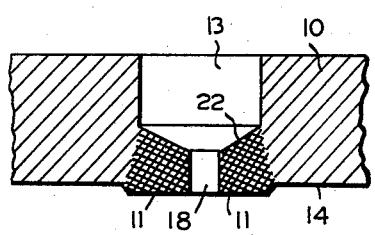
FIGURE 5 is a cross-section showing the completed hole or passageway in the spinnerette plate structure.

The portions of metal defining the orifice and portion of the hole or passageway adjacent the face side of the spinnerette plate indicated at H in FIGURE 5 will have enhanced properties of strength, rigidity, hardness, and resistance to erosion due to modifications brought about in its internal structure and grain size by the cold working or work hardening action of the process.

The tapered, wedge-shaped punch used to form the hole 17 should have an included angle between the sides of the punch that is between 20° and 40°. It has been found that with an angle of less than 20°, the punch breaks readily and, with an angle of over 40°, an undesirably large opening is formed. An angle of about 24° is preferred.

The invention is described in terms of a single hole or indentation and it is obvious that the production of the complete spinnerette involves the repetition of the described method as many times as desired to produce the desired number of holes for a given spinnerette design.

In one preferred arrangement embodying principle of this invention, a disk shaped spinnerette blank 3.120 inches in diameter and 0.312 inch thick made of type 430 stainless steel was drilled from the back to form a counterbore hole 0.094 inch diameter extending to within 0.110 inch of the spinnerette face. A blunt tipped ram 0.090 inch in diameter was positioned in said counterbore hole of the spinnerette and aligned with a backup die containing a cavity 3/16 of an inch in diameter and 1/8 inch deep. The cavity of the die has a 1/32 inch 45° chamfer. A pressure of 2.75 tons was exerted on said ram to form a protuberance on the face of said spinnerette approximately 0.250 inch in diameter and 0.010 inch in height. Said protuberance was lapped to remove about 0.002 to 0.003 inch from the crest to form a slight flat spot. Using a 24 degree tapered punch which is 0.025 inch in diameter at the tip, said protuberance was punched to form a tapered hole 0.015 inch deep. The face of the spinnerette was pressed under two tons pressure, flattening the protuberance and causing the tapered sides of said hole to become substantially parallel. The face of said spinnerette was then lapped to remove the rounded edges of the newly formed hole. The spinnerette hole was completed by continuing the counterbore drilling of the first step to a depth sufficient to meet the straight-walled hole formed on the face of said spinnerette. Obviously, broaching, polishing, or lapping may be performed as necessary according to methods well-known in the art.

In a modified arrangement, a spinnerette hole was constructed according to the method described in the preceding paragraph to the point of the formation of the flattened protuberance. The hole was completed by using a tapered punch having a trilobal cross-section. Each lobe of the cross-section was rectangular shaped, 0.003 inch thick, and 0.007 inch long. The punch was stamped into the protuberance on the face of the spinnerette and the hole was completed as in the remaining steps of the above procedure. Measurements made on the trilobal portion of the completed hole indicated this portion of the hole was 0.012 inch in length and the thickness of the lobes was 0.003 inch throughout the length of this portion of the hole.

In order to demonstrate the problems and defects of the prior art arrangements, using a trilobal punch with lobes 0.003 inch by 0.007 inch, a hole was made in a spinnerette blank using the conventional technique well-known to the prior art by punching through the counterbore and polishing the face of the spinnerette to form an orifice. Such a procedure is described in Pamm et al., U.S. 2,816,349, column 4, beginning on line 72. The trilobal capillary portion of this hole, or passageway, was measured and found to be 0.012 inch in length having lobes tapering from 0.003 inch thick at the spinnerette face to 0.006 inch thick at the counterbore end of the capillary portion of said hole, and was uniformly tapered throughout the length of the hole.

Spinning tests made with spinnerettes of the preceding two arrangements indicated that improved filament denier uniformity was obtained with the substantially cylindrical or parallel-sided holes or passageways as compared with the filament denier uniformity used for the tapered passageways or holes.

Figure 6:
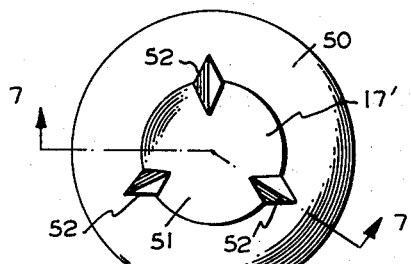
Figure 7:
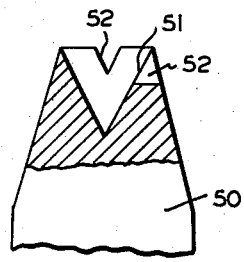
Figure 8:
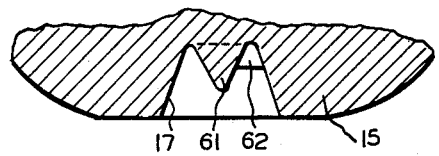
Figure 9:
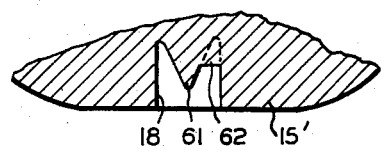
Figure 10:
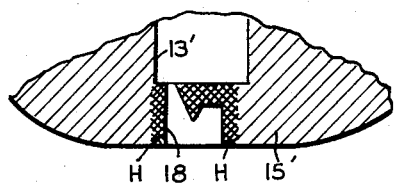
Figure 11:
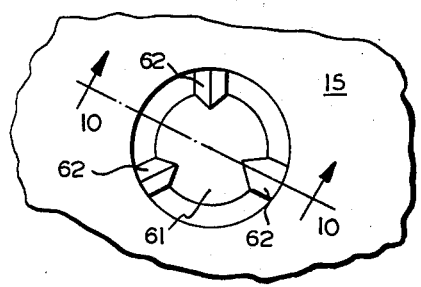

This invention was successfully aplied to fabrication of one piece integral spinnerette plates for spinning hollow filaments using the following approach. A spinnerette blank 3.120 inches in diameter and .312 inch thick was prepared by counterboring and pressing to form a protuberance as indicated in the earlier-discussed preferred version of this invention. A 24° tapered punch, similar to punch 50 shown in FIGURES 6 and 7, without notches 52, which was 0.025 inch in diameter at the tip and contained a 0.017 inch diameter tapered hole in the tip, was stamped into the face side of the protuberance. The tapered annular indentation or hole formed by said stamping step was in the shape of a circular tapered groove 0.015 inch deep, 0.004 inch wide at the bottom of the annulus, and 0.007 inch wide at the top of the annulus. The metal of the protuberance around the annulus was pressed at two tons pressure from the face side, to straighten the outer sides of the annular indentation to a substantially cylindrical configuration. A counterbore from the other side of the spinnerette plate was drilled until only 0.018 inch of metal remained between the counterbore and the face of the spinnerette. Using a drilling jig, three holes were drilled in the bottom of the counterbore to connect the counterbore to the bottom of the annular indentation on the face side of the spinnerette. These three holes were 0.015 inch in diameter and spaced 120° apart on the pitch diameter of the annular indentation and were drilled to within 0.005 inch of the spinnerette face. The three holes connecting the annulus to the counterbore were broached to remove burrs and complete formation of the orifice for spinning hollow filaments.

Another application of the principles of this invention to produce an orifice for spinning hollow filaments is set forth as follows: A counterbore was drilled in the back of a spinnerette plate. The counterbore was 0.094 inch in diameter and was drilled to within 0.110 inch of the spinnerette face. A blunt ram, 0.090 inch in diameter, was pressed through the counterbore using 2.75 tons pressure while the spinnerette was supported by a backup die similar to those used previously. This operation formed a somewhat rounded protuberance on the face of the spinnerette 0.250 inch in diameter and 0.007 inch in height from the face of the spinnerette. About 0.002 to 0.003 inch was lapped from the protuberance to form a slight flat surface. A tapered punch, shown as 50 in FIGURES 6 and 7, 0.025 inch in diameter, having an angle of 24° between the sides of the punch, was prepared having a recessed tip. The sides of the recessed tip form an angle of 12°. The leading edge of the punch was notched at three places 52, spaced 120° apart around the tip of the punch. The three notches 52 are 0.006 inch in width and 0.006 inch in depth. This punch was stamped into the protuberance on the face of the spinnerette to form an annulus 17' 0.015 inch deep, 0.004 inch wide at the bottom of the annulus, and 0.007 inch wide at the top of the annulus and an inner element 61 forming the central portion of the annular indentation. The tapered annulus contained three webs 62 0.006 inch high and 0.006 inch wide, formed by the notches 52 in the tip of the punch. The protuberance on the face of the spinnerette was pressed under two tons pressure until the outer walls 18' of the annulus were approximately parallel or cylindrical in configuration. The protuberance on the face of the spinnerette was lapped to remove the rounded corners of the annulus at the face of the spinnerette. The counterbore was extended to form a flat-bottomed counterbore leaving 0.015 inch of metal between the flat bottom of the counterbore and the face of the spinnerette. This operation connected the annulus in the face of the spinnerette to the counterbore, except for the webs 62 interconnected between the central element 61 and the rest of the spinnerette plate structure, which webs were formed by the notches 52 in the punch 50 used. The openings from the annulus to the counterbore were broached between the webs to remove burrs. The face of the spinnerette could be given a final laps as necessary to remove scratches.

Conventional type spinnerettes made by punching through the counterbore are generally limited to short capillaries. Likewise, spinnerettes made by punching from both sides of the spinnerette have either tapered capillaries or only short sections of straight sided holes. The spinning of some filaments through short capillary holes has been unsatisfactory, because of lack of structural support and insufficient spin orientation due to low jet velocity of the filament from the hole. Using the technique of this invention, it has been possible to produce improved spinnerette plates with capillary holes of considerably increased length, as long as 0.020 inch or more using certain punches whose cross-sectional configuration contributes to the rigidity of the punch in the manner provided by this invention.

In addition to providing an arrangement for the formation of long straight sided holes, the technique and construction of this invention has permitted the fabrication of many intricate and useful configurations previously believed to be difficult, if not impossible to construct. The technique of this invention is not limited to regularly shaped or symmetrically shaped holes. In addition to the round, square, rectangular, trilobal, or hollow-shaped holes described in the examples or known in the prior art, other polygon or geometric shapes are conceivable which may be suitably formed in the tip of a tapered punch designed according to this invention. By hollow-shaped or annular orifices is meant orifices which are capable of spinning filaments which contain continuous voids throughout their length. Such hollow shapes require a shaped obstruction supported within the confines of the periphery of a shaped hole by a supporting web or similarly functioning mechanical connection.

The improved spinnerette members or plates made by the process of the present invention may be of any conventional material employed in spinnerette construction. Metallic construction such as those of the stainless steels are especially suitable. The spinnerette plates made by the process disclosed are simple in construction, economical to fabricate, and effective in operation. Indeed their performance has been observed to be superior and improved with respect to prior art spinnerette plates. The novel spinnerette structures of this invention are improved over the prior art structures and are distinguished by their simple unitary construction even in the form suitable for spinning hollow filaments, and by the elongated cylindrical capillary portions of the passageway adjacent the orifice which give greater filament denier uniformity, and also by the work hardened structure which defines the capillary portion of the passageway and its orifice in order to give significantly increased rigidity, strength, hardness, and resistance to erosion.

Although a limited number of preferred embodiments of this invention have been disclosed, other modifications within the spirit of this invention will occur to those skilled in the art. All such modifications are considered to fall within the scope of the following claims.

We claim:

1. An improved unitary integral spinnerette plate member of metallic composition, said member comprising one side provided with a spinning face, and an other side, said member further comprising at least one passageway extending therethrough intersecting said spinning face to form a spinnerette orifice, said passageway having adjacent said orifice an elongated capillary portion of substantially constant transverse cross section, the interior surfaces of which capillary portion are substantially cylindrical in configuration, the structure of said member defining said portion of said passageway and said orifice having a grain substantially reduced in size and a cold work hardened internal structure modified, relative to the remainder of said member composition, to give a significantly improved rigidity, hardness, strength and resistance to erosion relative to the remainder of said member composition.

2. An improved one-piece spinnerette plate member of metallic composition, said member comprising one side provided with a spinning face, and an other side, said member further comprising at least one passageway extending therethrough intersecting said spinnerette face to form a spinnerette extrusion orifice, said passageway having adjacent said orifice an elongated capillary portion with a substantlialy cylindrical interior wall surface, said passageway capillary portion provided adjacent said orifice with a central element integrally formed with the plate member and supported in said portion by attachment with said interior wall surface to form an orifice of annulur configuration, the structue of said member of said metallic composition defining said capillary portion of said passageway, said orifice and said central elements having a grain substantially reduced in size and internal structure significantly modified, relative to the remainder of structure of said member as to rigidity, hardness, strength, and resistance to erosion.

References Cited by the Examiner

UNITED STATES PATENTS

| 2,360,680 | 10/1944 | Holzmann | 18—8 |
| 2,770,987 | 11/1956 | Cupler. | |
| 3,095,258 | 6/1963 | Scott. | |
| 3,131,427 | 5/1964 | Mika et al. | 18—8 |

J. SPENCER OVERHOLZER, *Primary Examiner.*

MICHAEL V. BRINDISI, *Examiner.*